United States Patent Office 2,980,532
Patented Apr. 18, 1961

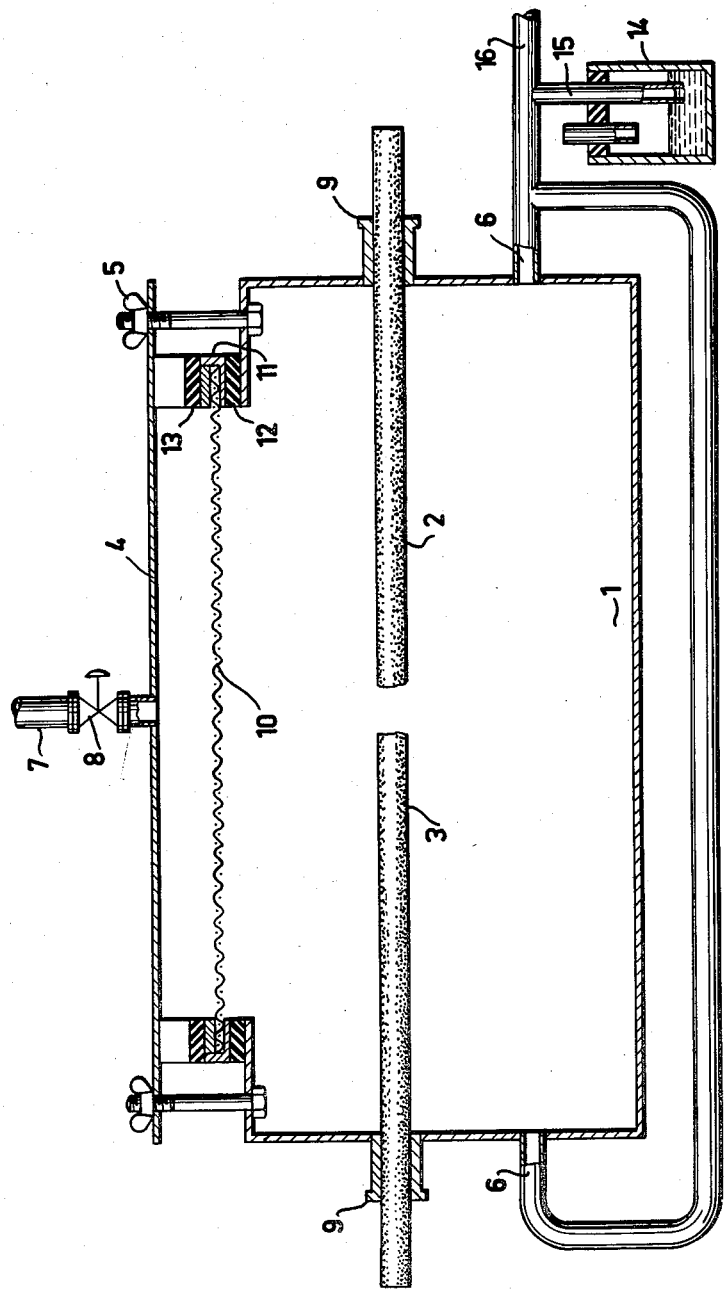

2,980,532

METHOD OF PRODUCING PERMEABLE MEMBRANES

Karl Mårten Martensson, Claes Peter Löfman, and Erik Ingemar Eriksson, Stockholm, Sweden, assignors to Aktiebolaget Atomenergi, Stockholm, Sweden, a company of Sweden Filed Jan. 12, 1959, Ser. No. 786,436
Claims priority, application Sweden Jan. 10, 1958
11 Claims. (Cl. 75—205)

The present invention relates to a method of producing permeable membranes. These membranes are primarily intended for use in the separation of isotopes by means of gas diffusion or in the separation of gas mixtures by means of the same method. A very important field of application is the separation of the uranium isotopes.

Membranes to be used for separation by gas diffusion, especially of the uranium isotopes, should comply with the following requirements:

(1) The average pore radius should be within the range of 100–300 A.U. (the requirement of optimum pore radius).

(2) The permeability should be as great as possible (the requirement of high permeability).

(3) The membrane should possess a good mechanical strength and be able to withstand pressure differences and vibrations (the requirement of strength).

(4) The membranes should possess a good chemical resistance against the working medium, for instance uranium hexafluoride (the requirement of corrosion resistance).

In membranes produced by pressing and sintering of powder there is a relation between the average pore radius and the average particle size of the powder. Experience shows that in order to obtain an average pore radius which is most favourable for separation of the uranium isotopes, the diameter of the powder particles should be of the order of 1000 A.U.

It is obvious that the above mentioned requirements 2 and 3 are at variance. The fact is that it is always possible to increase the permeability by decreasing the thickness of the membrane, but generally this cannot be done without neglecting the requirement of strength. When it comes to producing plane, sintered membranes of such a size (about 10 dm.$^2$ or larger) that is desirable for a separation plant on an industrial scale it is generally necessary, by reason of strength, to make the membranes so thick that considerable concessions as regards permeability will be the result. In manufacturing plane, sintered membranes there must be a preparatory working moment of distributing the powder in one way or another in a plane layer, which is thereupon pressed and sintered. In doing so one must pursue a distribution in a very even layer, as otherwise a pressure varying over the surface of the membrane is obtained at the pressing, which results in inhomogeneous membrane properties. Similarly, if the powder is not evenly distributed such large pores may be formed in the finished membrane that the membrane will be unfit for its purpose. It is obvious that the thinner membranes one seeks to attain the stronger the requirement must be of the powder to be distributed in an even layer from the beginning, in other words, the harder it will be to avoid inhomogeneous membrane properties and the occurrence of such large pores that the membrane becomes unusable.

The present invention relates to a method of producing membranes which are at the same time thin and strong. This method is characterized in that the solid powder particles from which the membrane is to be produced are suspended in a suspension medium and that the suspension then is brought into contact with a close meshed network in such a way that the particles deposit in a layer on one or both sides of the network which is thereupon pressed and sintered together with the powder layer into a membrane.

In the following a number of methods will be described of producing powder suspensions having suitable properties. In these methods the suspension medium consists of a gas.

Trial has thus shown that if aluminium is disintegrated in an electric arc where one or both electrodes consist of aluminium, and if the disintegration takes place in nitrogen, a powder is obtained which will appear in the form of a suspension in the nitrogen immediately after it has been formed. Thus the suspension is formed automatically in direct connection with the production of the powder. Furthermore, the powder acquires such properties so as to make it particularly adaptable for producing permeable membranes, especially for separation of the uranium isotopes.

The method will be illustrated in greater detail by way of an example with reference to the attached drawing showing an apparatus for producing membranes having an area of 4 dm.$^2$. In a receptacle 1 there are arranged two aluminium electrodes 2 and 3, which are fed from a current source, not shown. A flow of nitrogen having room temperature and atmospheric pressure is conducted through the receptacle at a velocity of 5–10 litres per minute.

In one experiment the electrodes were supplied with a direct voltage of 30 volts and the electrode spacing was adjusted in such a way that the current was 7 amperes. Under these conditions the electrode material disintegrates (or volatilizes) to form a powder which initially appears as a fume or a suspension in the nitrogen but by degrees partly deposits as an even coating on the walls of the receptacle, partly entrains in the flow of nitrogen leaving the receptacle. Electron microscopic photographs have shown that the powder consists of an agglomerate of mostly spherical particles having a diameter of about 1000 A.U. Furthermore, quantitative analysis has shown that 90% of the powder produced under the conditions above stated consists of aluminium nitride and the rest of metallic aluminium.

For the time being it is uncertain whether the powder is formed by so called cathodic disintegration, i.e. as a result of the cathode being bombarded by the positive ions which are formed in the arc, or by a regular volatilization of the electrode material. Possibly both of the said processes are of importance for the powder formation. A direct observation of the course of events shows that primarily the cathode is consumed during the process, but on the other hand slag-like outgrowths or crusts are formed on the cathode which tend to grow in the direction towards the anode. A continuous powder formation takes place when the cathode is consumed at the same rate as these crusts manage to grow out so that the length proper of the arc remains constant. Such an equilibrium is difficult to carry into effect, and as a rule the crusts grow more quickly so that the gap between the electrodes is bridged and the arc goes out. On the other hand the crusts are porous which causes several local arcs to originate between different portions of the crusts. As long as this takes place the formation of nitride powder proceeds.

The crusts too consist to the greater part of aluminum nitride, and it seems plausible that they originate by disintegration at the cathode of aluminium which immediately combines with the nitrogen to form aluminium nitride, which in turn wholly or partially deposits in the form of a coating on the cathode. Whether the aluminium nitride appearing in the form of a powder in the gas phase likewise is formed by a cathode disintegration in a proper sense, or secondarily by a volatilization of the said crust-like coating, has not been possible to settle for the time being.

After the arc has gone out in consequence of the fact that the nitride crust emanating from the cathode has grown out so that the gap between the electrodes is bridged, it may be relighted after the crust has been removed. This may usually be done from the outside by the electrodes, which are slightly movable laterally, being rubbed against one another so that the crust loosens.

The figure also shows a device for depositing the powder on a metallic wire network. The device according to the figure is provided with a lid 4 which may be screwed on by means of eight finger nuts 5. The plate receptacle is provided with two gas inlets 6 connected to a supply pipe 16, and the lid is provided with a gas outlet 7 having a valve 8. The two metal electrodes 2 and 3 are held in position by means of Teflon bushings 9. Alternatively the receptacle may be provided with two or more pairs of electrodes. A network 10 is secured in a mounting frame 11, which in turn is clamped between the lid and the receptacle. 12 and 13 are rubber gaskets which partly ensure that the clamping becomes tight and partly insulate the network from the receptacle. In the wall of the receptable two diametrically opposed glass windows are mounted so that it becomes possible to control the arc from the outside. When the gas flow with suspended particles of the powder formed in the arc passes the network, the particles are caught and form an even deposit on the wire network. When the deposit becomes thicker its flow resistance increases and a pressure is created in the receptacle. This pressure is opposed, however, by the overpressure valve 14, which consists of a branch pipe 15 provided in the supply conduit and extending down into a container with mercury.

In a number of trials nickel networks have been used having a wire diameter of 35 microns and a mesh width of 40 microns. On such a network a particularly even deposition of powder is obtained. The powder may be applied one side only or on both sides, in which later case the mounting frame 11 is turned after a layer has been formed on one side of the network.

It is possible to improve still the homogeneity of the powder deposit obtained on the wire network in the manner stated by an electric voltage being applied to the network, which voltage essentially deviates from the voltages of the two electrodes. Alternatively, one or more metal wires may be provided adjacent the network and an electric voltage be applied between the network and these wires. In both cases an effect is obtained which is known from the art of electrical filters.

After the powder layer (or powder layers) has reached sufficient thickness the arc is broken and the nitrogen flow cut off. The wire network is loosened from the mounting frame 11 and is compressed together with the powder between the plane surfaces of a pressing tool. Compression pressures varying between 1000 and 5000 kp./cm.$^2$ have been used. At the compression a part of the powder is pressed into the meshes of the network and a very strong combination is obtained. This mere compression renders the membrane so strong that it may be readily handled. However the strength is still more improved by sintering the membrane at an elevated temperature. Sintering temperatures varying between 600° and 800° C. and sintering periods between 3 and 60 minutes have been used. The sintering has i.a. been performed in a hydrogen atmosphere. The finished membranes have a thickness of about 50 microns only, but nevertheless they possess a very high strength. If the above stated trial conditions prevail and if the compression pressure is 400 kp./cm.$^2$, the sintering temperature 750° C. and the sintering period 5 min., membranes are obtained having permeabilities in the range of 1.2–2.5 cm.$^3$ air at N.T.P. per sec. and cm.$^2$ membrane area at a pressure difference of 1 atm. and average pore radii in the range of 175–350 A.U.

Under the conditions stated above concerning the voltage and current of the arc, a powder was obtained to about 90% consisting of aluminium nitride. Trials have shown, however, that if the current is raised to considerably higher values a powder is obtained which contains a larger share of metallic aluminium. It is thus possible to produce a powder having a content of 40% aluminium, if a current of about 75 amperes is used. The ground for the higher aluminium content in this case seems to be that the aluminium of the electrodes volatilizes and then immediately condenses, there being no time for any nitride formation to take place.

For the time being it is uncertain whether membranes produced of a powder to the greater part consisting of aluminium nitride are sufficiently resistant against $UF_6$. The trials hitherto carried out with these membranes in order to establish the corrosion in uranium hexafluoride have not given unequivocal results. The fact, however, that aluminium nitride is comparatively very resistant against halogens, which has been proved, indicates that aluminium nitride also should possess a high resistance against uranium hexafluoride.

It is known that aluminium oxide is eminently resistant against uranium hexafluoride. Trials have shown that if a powder, which to the greater part consists of aluminium nitride and which is produced in the manner stated above, is treated with air or oxygen at an elevated temperature, the aluminium nitride will be transformed partly into aluminium oxide. At one trial the powder was thus heated to 750° C. for 16 hours and it was established by analysis that 35% of the powder had been transformed into oxide. The colour of the powder is changed by this treatment from grey to white. It is likely enough that during the oxidation a surface layer of aluminium oxide is formed which surrounds the powder particles and protects the inner portions against attack, for which reason a complete oxidation is difficult to carry out.

Membranes produced in the manner stated above of a powder to the greater part consisting of aluminum nitride may also be transformed partly into aluminum oxide by being heated in air or oxygen. Thus in a number of trials membranes were heated to 750° C. for 4 hours and it was proved that on the average 25% of the nitride had changed into oxide. The colour of the membranes was changed from grey to white. It is likely in this case too that a protective layer is formed on those surfaces of the membrane which are in contact with the air or oxygen. By causing the air or oxygen to flow through the membrane during the heating it is possible to attain the feature that the walls of the pores in the interior of the membrane are coated with a layer of aluminum oxide. Thus, if membranes made of a powder of aluminum nitride are insufficiently resistant against uranium hexafluoride it is possible, by treating the membranes in the above stated way, to coat those interior surfaces which are in contact with uranium hexafluoride with a protective layer of aluminum oxide, whereby a perfectly satisfactory resistance against uranium hexafluoride is attained.

It has been found that the strength of the membranes is not impaired by the treatment stated and that their separating capacities and permeabilities remain substantially unchanged.

A membrane in which the aluminum nitride has been partly transformed into aluminum oxide, may also be prepared by sintering the membrane in air or oxygen, instead of hydrogen as was stated above. The desired oxidation of the aluminum nitride then takes place already at the sintering, which in this case replaces the two above mentioned working moments, that is, sintering in hydrogen and a subsequent treatment at an elevated temperature in air or oxygen.

It has turned out to be possible and from certain points of view advantageous to have the compression replaced by rolling. This may be done in such a way that the wire network, after the powder layer has been applied on one or both sides of it in the manner stated above, is placed between two foils of a metal having a great hardness after which the network is rolled together with the two foils between cylindrical rollers and at a suitable pressure of rolling. Thereupon the membrane is sintered as stated above. Trials have shown that membranes rolled and sintered in this way possess qualities which are entirely comparable with those of membranes which have been pressed instead of rolled and then sintered. In producing large membranes rolling may be technically simpler, quicker and cheaper than pressing, and it may permit a continuous method of production. The rolling may also be performed without the wire network with the powder layer first having to be placed between two metal foils.

At the disintegration or volatilization of aluminum in an arc in the manner described above, the nitrogen may wholly or partially be replaced by air or oxygen (or with some other gas mixture containing oxygen and an inert gas). In this case a powder will be formed which consists of aluminum oxide provided that there is a sufficient percentage of oxygen in the gas mixture. This powder appears in the beginning in suspended form in the gas phase and may be deposited on a close meshed network in the same way as described above. Trials have thus been made by means of the apparatus shown in the figure, a gas mixture being used having a content of 5–10% oxygen and nitrogen for the rest. The voltage between the aluminum electrodes was about 30 volts and the current was about 7 amperes. A powder was obtained consisting of pure aluminum oxide. Membranes made of this powder and for the rest in the manner described above (pressing at 4000 kp./cm.$^2$, sintering for 5–30 minutes at 110° C.) have shown permeabilities in the range of 1.2–2.0 cm.$^3$ air at N.T.P. per sec. and cm.$^2$ membrane area at a pressure difference of 1 atm., and average pore radii in the range of 300–450 A.U. At insufficient supply of oxygen to the receptacle a powder is formed which consists of aluminum oxide and aluminum nitride in a quantity ratio determined by the local oxygen content around the arc.

Trials have also been made in which nickel electrodes have been disintegrated or volatilized in an arc in nitrogen of atmospheric pressure and room temperature. The voltage across the electrodes was about 30 volts and the current was about 10 amperes. A powder was obtained which consisted of pure nickel and was composed of spherical particles having a diameter of the order of 1000 A.U. In a number of trials membranes have been produced of this powder by means of the method of the present invention as described above. Certain modifications are necessary, however, in producing membranes of nickel powder inasmuch as the sintering of the powder layers deposited on a close meshed network must be performed under pressure, as otherwise microscopical holes are formed as a consequence of the contraction during the sintering, which holes make the membrane unusable. This contraction, which as a rule occurs at the sintering of nickel membranes, is efficiently counteracted by the sintering taking place under pressure. In a number of trials membranes have been made of nickel powder produced under the above stated conditions. The networks with the deposited powder layers were first pressed at room temperature at a pressure of 1000–4000 kp./cm.$^2$ and were then sintered at 750–850° C., the compression pressure being 1000–2000 kp./cm.$^2$. In other trials the precompression was omitted and only one compression operation was made, that is in connection with the sintering. In the said ways membranes have been produced having permeabilities in the range of 0.2–1.0 cm.$^3$ air at N.T.P. per sec. and cm.$^2$ membrane area at a pressure difference of 1 atm., and average pore radii in the range of 300–800 A.U.

The three methods described above for producing a powder for permeable membranes in such a way that the powder is suspended in a gas phase in connection with its production and thereafter is deposited on a close meshed network, are all based upon disintegration (or volatilization) in an electric arc. It is obvious that this arc method offers extensive possibilities of variation. Thus other metals than those mentioned here are conceivable as electrode material. Further, other gases (or gas mixtures) than those occurring above may be selected. Furthermore, the pressure and temperature of the gas may be varied. Finally it may be possible to change the properties of the powder by varying the voltage and current of the arc.

The possibilities of producing a powder for permeable membranes in such a way that the powder is suspended in a gas phase in connection with its production and thereupon is deposited upon a close meshed network according to the present invention are not restricted, however, to the arc method described above. For instance, it is possible to burn, in a manner known per se, volatilized metal salts in air or oxygen (or oxygen mixtures) so as to form the corresponding metal oxide which may be obtained in the form of a powder which occurs in suspended form in a gas phase and is then deposited, in accordance with the present invention, on a close meshed network and compressed and sintered to form permeable membranes. Thus, volatilized aluminium chloride may be burnt in an atmosphere containing oxygen, so as to form a powder of aluminium oxide.

In the foregoing methods have been described according to which the suspension medium has been a gas and the suspended particles have been metals or metal compounds. As a matter of course the method according to the invention may also be carried into effect with liquid suspension media. Likewise the suspended particles may consist of other materials than metals or metal combinations, for instance, organic materials such as plastics. As regards membranes for separation of the uranium isotopes the carbon fluorides, such as those of the Teflon type, which are resistant against uranium hexafluoride, are of special interest.

What is claimed is:

1. A method of producing a permeable membrane which comprises vaporizing a metallic electrode in a gas atmosphere by means of an electric arc, collecting finely divided material from said atmosphere directly on a metallic network, compressing said collected material together with the network to form a compressed unit and sintering the resulting compressed unit.

2. A method as defined in claim 1 in which the gas atmosphere is caused to flow through said network.

3. A method as defined in claim 1 in which an electric potential is impressed upon said network to attract said finely divided material thereto.

4. A method as defined in claim 1 in which the electrode is aluminum and said atmosphere is nitrogen.

5. A method as defined in claim 1 in which the electrode is aluminum and said atmosphere contains oxygen.

6. A method as defined in claim 1 in which the electrode is nickel.

7. A method as defined in claim 1 in which the compression is effected by rolling.

8. A method as defined in claim 1 in which the metal is aluminum and the compressed and sintered unit is heated in an atmosphere containing oxygen.

9. A method as defined in claim 1 in which the sintering is effected in an atmosphere containing oxygen.

10. A method for the production of a permeable membrane which comprises burning a metal salt in an atmosphere containing oxygen, depositing finely divided material from said atmosphere on a metallic network, compressing the deposit and sintering the compressed unit together with the network to form a compressed unit.

11. A method as defined in claim 10 in which the metal salt is an aluminum salt.

References Cited in the file of this patent

UNITED STATES PATENTS

| | | |
|---|---|---|
| 1,128,175 | Morf | Feb. 9, 1915 |
| 1,928,435 | Powell | Sept. 26, 1933 |
| 2,189,387 | Wissler | Feb. 6, 1940 |
| 2,371,105 | Lepsoe | Mar. 6, 1945 |
| 2,411,660 | Manning | Nov. 26, 1946 |

UNITED STATES PATENT OFFICE
CERTIFICATION OF CORRECTION

Patent No. 2,980,532            April 18, 1961

Karl Mårten Martensson et al.

It is hereby certified that error appears in the above numbered patent requiring correction and that the said Letters Patent should read as corrected below.

Column 7, lines 4 and 5, strike out "together with the network to form a compressed unit" and insert the same after "deposit", in line 4, same column 7.

Signed and sealed this 22nd day of August 1961.

(SEAL)
Attest:

ERNEST W. SWIDER
Attesting Officer

DAVID L. LADD
Commissioner of Patents